(12) United States Patent
Lee et al.

(10) Patent No.: US 8,482,231 B2
(45) Date of Patent: Jul. 9, 2013

(54) MOTOR DRIVING APPARATUS HAVING ADJUSTABLE SLOPE OF MOTOR SPEED

(75) Inventors: Teng-Hui Lee, New Taipei (TW); Kuo-Yung Yu, New Taipei (TW)

(73) Assignee: Amtek Semiconductor Co., Ltd., New Taipei ( * ) Notice: Subject to any disclaimer, the term of this patent is extended or adjusted under 35 U.S.C. 154(b) by 163 days.

(21) Appl. No.: 13/275,726

(22) Filed: Oct. 18, 2011

(65) Prior Publication Data
US 2013/0015795 A1    Jan. 17, 2013

(30) Foreign Application Priority Data

Jul. 12, 2011    (TW) .............................. 100124689 A (51) Int. Cl.
*H02P 6/00* (2006.01)
(52) U.S. Cl.
USPC ................. 318/400.01; 318/400.13; 318/722; 318/432; 318/811
(58) Field of Classification Search
USPC ............. 318/400.01, 400.05, 400.06, 400.13, 318/722, 723, 432
See application file for complete search history.

(56) References Cited

U.S. PATENT DOCUMENTS

| | | | |
|---|---|---|---|
| 7,509,032 B2* | 3/2009 | Jami | 388/811 |
| 8,350,504 B2* | 1/2013 | Lee et al. | 318/400.01 |
| 8,432,111 B2* | 4/2013 | Lee et al. | 318/400.01 |
| 2012/0326643 A1* | 12/2012 | Brannen | 318/400.11 |

* cited by examiner

*Primary Examiner* — Eduardo Colon Santana
*Assistant Examiner* — Thai Dinh
(74) *Attorney, Agent, or Firm* — Ming Chow; Sinorica, LLC (57) ABSTRACT

A pulse width modulation (PWM) module is configured to adjust the input PWM control signal and the motor can be implemented in different rotation speed to enhance the flexibility of the implementation of the motor when the PWM control signals are the same. In addition, the PWM modulation block in the present invention includes a PWM direction control circuit, a PWM vector transfer circuit and a PWM signal generation circuit. Apparently, the PWM modulation block of the present invention is connected to a PWM control signal inputted by an external system and an external adjustment apparatus; by setting up the adjustment apparatus, the vector and the modulation direction of the PWM control signal can be adjusted, and the duty cycle of the PWM control signal can also be adjusted.

19 Claims, 9 Drawing Sheets

MOTOR DRIVING APPARATUS HAVING ADJUSTABLE SLOPE OF MOTOR SPEED

BACKGROUND OF THE INVENTION

1. Field of the Invention

The present invention is related to a motor driving apparatus, and more particularly related to a driving apparatus to adjust motor rotation slope. There is a PWM modulation block to adjust the PWM pulse wave to vary the inputted PWM signal and the motor can have different rotation speed at the same PWM input signal so as to increase the flexibility of the implementation of the motor. In addition, the motor driving apparatus in the present invention is a signal phase motor or a three-phase motor.

2. Description of the Prior Art

Figure 1A:
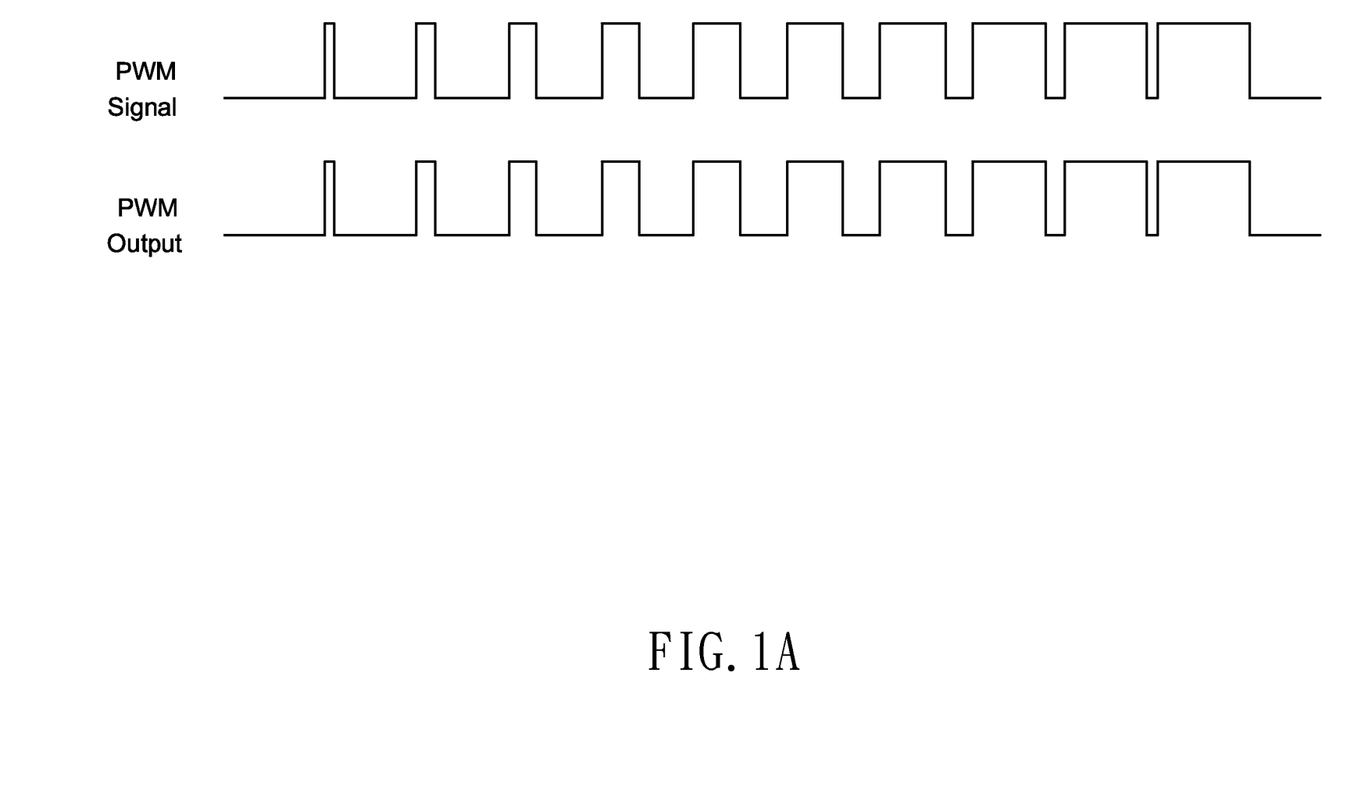
FIG. 1A is a view illustrating a conventional pulse width modulation (PWM) motor driving method.
Figure 1B:
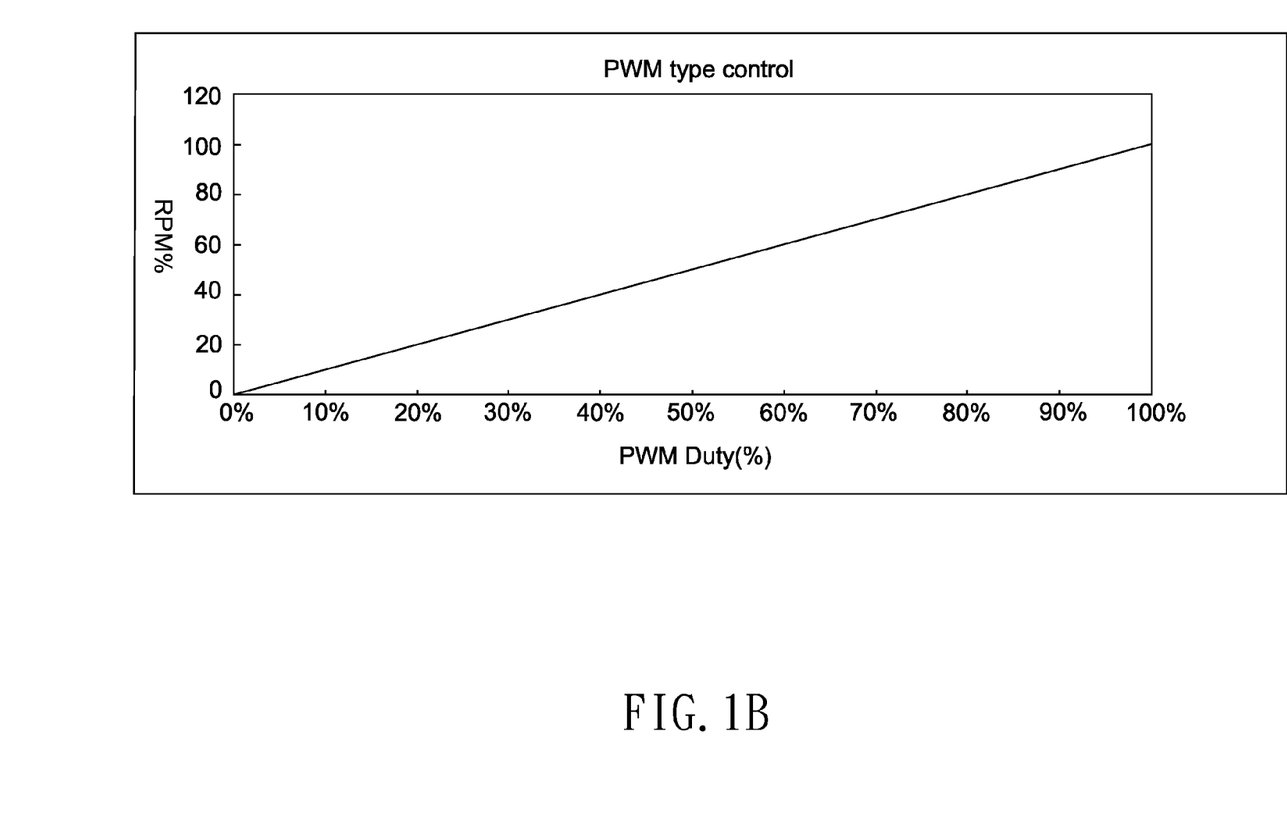
FIG. 1B is a curve view illustrating a conventional PWM motor driving method.

The conventional motor driving method controlled by the pulse width modulation (PWM) is that the input duty of the PWM is corresponding to the output duty of the motor, as shown in FIG. 1A. For example, when the input duty cycle of the PWM is 50%, the output duty cycle of the motor is 50%. Therefore, the control curve of the duty of the motor is a linear curve, as shown in FIG. 1B.

The user would like to change the duty of the motor in accordance with the practical operation situation by adjusting the input duty cycle of the PWM. For example, when the temperature of the Central Processor Unit (CPU) of the personal desktop or laptop is increased, in order to decrease the temperature of the CPU, the input duty cycle is changed. Otherwise, the wire coil of the motor is changed to increase the duty of the motor when the duty cycle of the motor is the same. In a good design motor system, it is difficult to practically operate by implementing these two methods. For example, when the input duty cycle of the PWM by the controller (digital signal processor (DSP)) is changed in accordance with the practical operation situation, the control method in the whole system must be changed. When the wire coil of the motor must be changed, the motor has to be substituted.

In order to include the adjust function of the duty of the motor when the PWM controlling the motor to drive, there is a PWM modulation block is included in the PWM controlling motor driving apparatus to adjust the slop of the duty of the motor so as to include an adjust mode in PWM control. Therefore, the flexibility of the implementation of the duty of the motor is increased when the PWM control motor driving apparatus. The flexible of the PWM control motor driving apparatus to control the duty of the motor is creased.

SUMMARY OF THE INVENTION

The main object of the present invention is to provide a pulse width modulation (PWM) module and the PWM modulation block is configured to adjust the inputted PWM control so as to adjust the slope of the motor output rotation speed.

Another object of the present invention is to provide a PWM modulation block to adjust the inputted PWM control signal, so the motor driving apparatus is able to adjust the motor rotation speed slope in accordance with the requirement of the motor output.

Therefore, according to the objects described above, a motor driving apparatus with a pulse width modulation (PWM) module comprising a motor, a motor output unit connected to the motor and a PWM modulation block, and the PWM modulation block including a PWM direction control circuit configured to output a voltage signal; a PWM vector transfer circuit and an input end of the PWM vector transfer circuit is connected to the PWM direction control circuit and configured to convert a PWM control signal to be a vector voltage and the PWM control signal is transmitted to an output end; and a PWM signal generation circuit, an input end of the PWM generation circuit is connected to the PWM direction circuit and outputs a signal generation voltage modulation signal; wherein the signal generation voltage modulation signal is an output current transmitted from a current control circuit and the current is transmitted to a current-to-voltage converter to generate the signal generation voltage modulation signal and the signal generation voltage modulation signal is transmitted to the motor output unit.

According to the another objects described above, a motor driving apparatus with a PWM modulation block comprising a three-phase motor, a three-phase motor output unit connected to the three-phase motor and a PWM modulation block, and the PWM modulation block includes a PWM direction control circuit, a PWM vector transfer circuit and a PWM signal generation circuit. An input end of the PWM direction control circuit is connected to an external adjusting apparatus and the external adjusting apparatus is configured to provide a first voltage, and another input of the PWM direction control circuit is connected to a reference voltage and output a voltage signal after the first voltage is compared with the reference voltage. An input end of the PWM vector transfer circuit is connected to the PWM direction control circuit and configured to convert a PWM control signal to be a vector voltage and the PWM control signal is transmitted to an output end. An first input end of the PWM generation circuit is connected to the first current and the second current, a second input end is connected to the voltage signal of the PWM direction control circuit, a third end is connected to a PWM control signal and outputs a modulation signal voltage modulated signal. Wherein the signal generation voltage modulation signal is a current calculated by a current control circuit, and the current is transmitted to a current-to-voltage converter to output a signal generation voltage modulation signal and the signal generation voltage modulation signal is outputted to the three-phase motor driving unit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The foregoing aspects and many of the attendant advantages of this invention will become more readily appreciated as the same becomes better understood by reference to the following detailed description, when taken in conjunction with the accompanying drawings, wherein:

The present invention is related to a motor driving apparatus, and more particularly to a driving apparatus configured to adjust a motor rotation speed slope. The driving apparatus can utilize a PWM modulation to change the input pulse width modulation (PWM) signal by adjusting a PWM pulse wave. Therefore, the rotation speed of the motor is changeable when the PWM input signal is the same so as to enhance the flexibility of the implementation of the motor. Moreover, in order to clearly specify the operation procedure of the motor driving module in the present invention, only the single-phase motor is implemented in the present embodiments to describe in the following chapters. However, the implementation of the present invention is not limited in the signal-phase motor, and the multi-phase motor can also be used in the present invention. In the following description, the detail description of the driving method of the single-phase motor or multi-phase motor is omitted herein and it is the detail description about the PWM modulation block in the present invention.

Figure 2A:
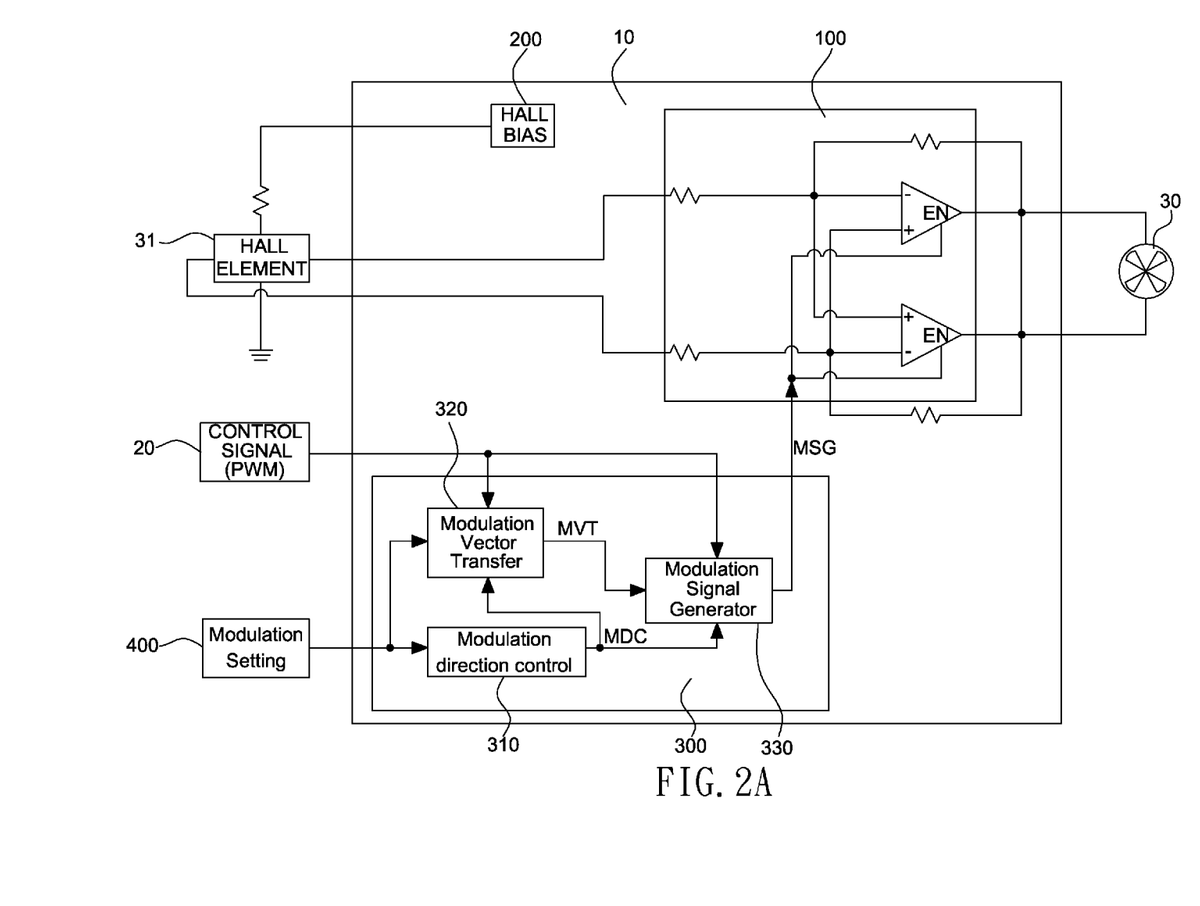
FIGS. 2A and 2B are views illustrating the motor driving apparatus in the present invention.
Figure 2B:
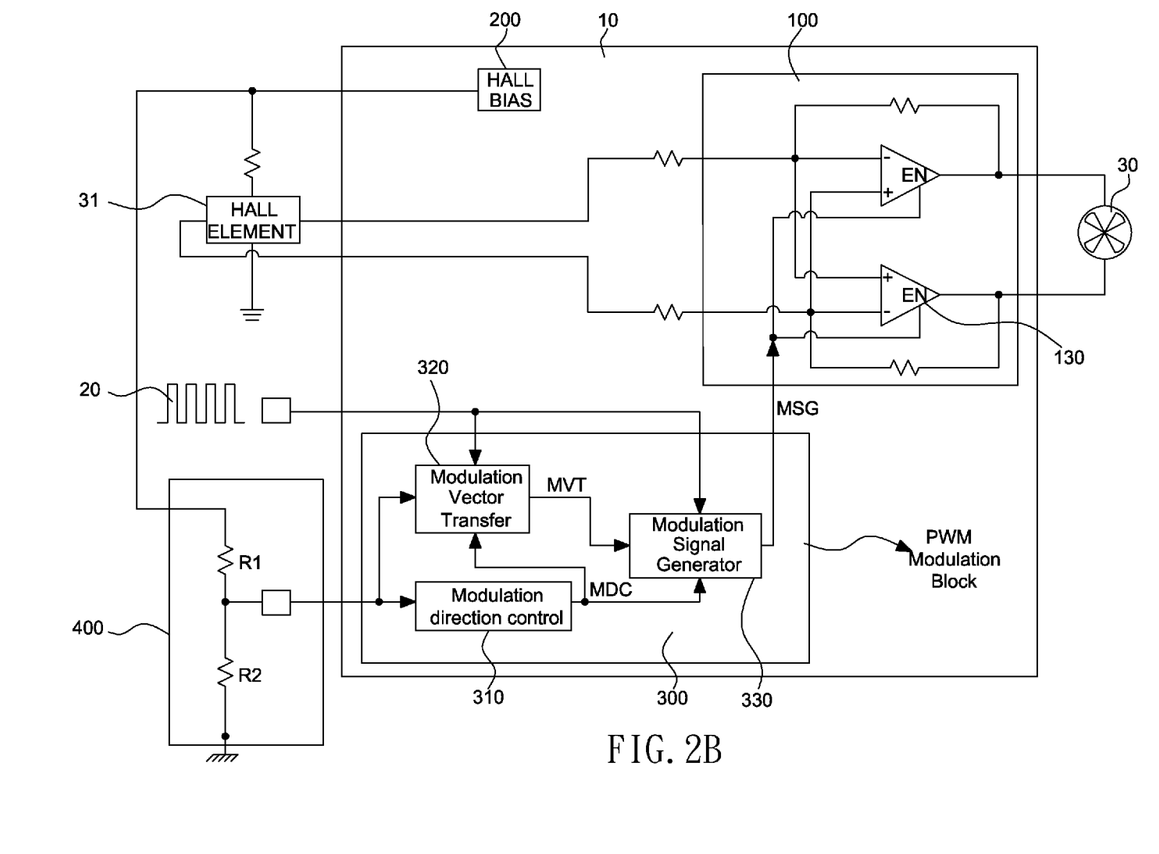

First of all, FIGS. 2A and 2B are views illustrating the motor driving apparatus in the present invention. FIG. 2A is a functional block diagram of the motor driving apparatus in the present invention and FIG. 2B is a view illustrating a module circuit in FIG. 2A. As shown in FIG. 2A, the motor driving apparatus 10 in the present invention includes a output unit 100 connected to the signal-phase motor 30, a Hall unit 31 disposed in the signal-phase motor 30, a Hall voltage unit 200 for supporting the Hall unit 31 to do the detection, and a PWM modulation block 300 configured to adjust the motor rotation slope. The PWM modulation block 300 includes a PWM Direction Control Circuit 310, a PWM Vector Transfer Circuit 320, and a PWM Signal Generation Circuit 330. Apparently, the PWM modulation block 300 is connected to the external adjusting apparatus 400 and configured to receive a PWM control signal 20 inputted from an external system. The PWM modulation block 300 is configured to setup the adjusting apparatus 400 to vary the vector value and the modulation direction of the PWM control signal 20 so as to adjust the duty cycle of the PWM control signal 20. In this embodiment, only single-phase motor is used to describe in the PWM modulation block 300, but three-phase motor drive can also be implemented in the present invention. Also, the Hall voltage unit 200 is configured to provide the voltage for the Hall unit 31 to do the detection and also provide bias for the external adjusting apparatus 400. Therefore, the Hall voltage unit 200 in the present invention is disposed in the motor driving apparatus 10 alternatively or the Hall voltage unit 200 is provided by the external power source of the motor driving apparatus 10 in the present invention. The disposition of the motor driving 10 in the present invention is not limited herein.

Now referring to FIG. 2B, the PWM modulation block 300 in the present invention is respectively connected to the external system configured to output the PWM control signal 20 and the external adjusting unit 400. The external system, such as a personal desktop or a digital signal processor of a notebook motherboard, is a digital signal process (DSP) configured to output a PWM control signal 20. The PWM control signal 20 is electrically connected to the PWM vector transfer circuit 320 and the PWM signal generation circuit 330. In addition, the external adjusting unit 400 is a bleeder circuit and one end of the external adjusting unit 400 is connected to the Hall voltage unit 200 and the other end is connected to the PWM direction control circuit 310 and the PWM vector transfer circuit 320 in the PWM modulation block 300. In the present embodiment, the external adjusting unit 400 is a bleeder circuit made by several resistors and configured to provide a voltage to the PWM modulation block 300. Therefore, by setting up the external adjusting unit 400, the duty cycle of the PWM control signal 20 is adjustable.

Figure 3:
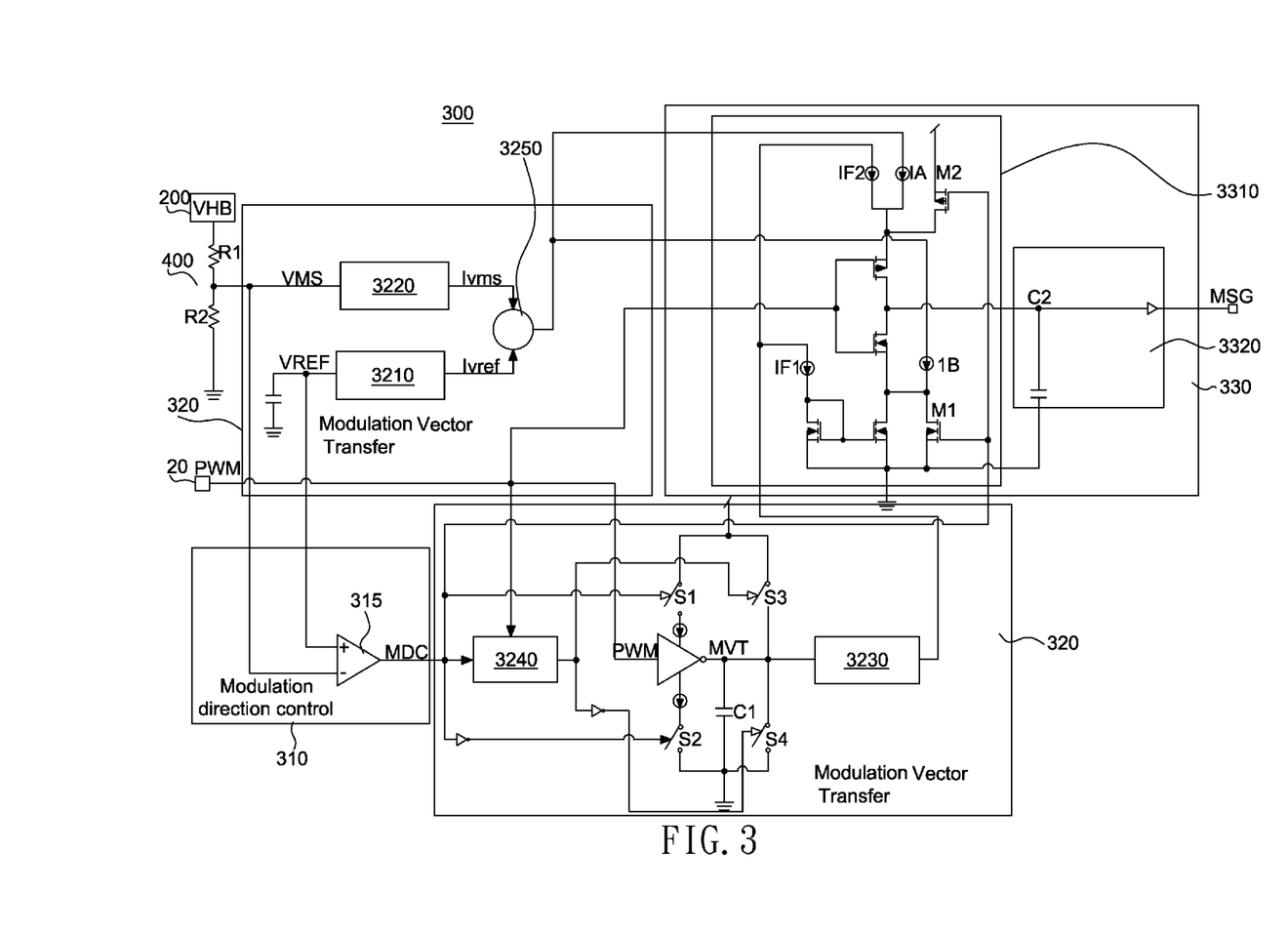
FIG. 3 is a circuit view illustrating the PWM modulation block in the present invention.

FIG. 3 is a circuit view illustrating the PWM modulation block in the present invention. As shown in FIG. 3, The PWM modulation block 300 includes a PWM Direction Control Circuit 310, a PWM Vector Transfer Circuit 320, and a PWM Signal Generation Circuit 330. The PWM direction control circuit 310 is made by a comparator 315. One end of the comparator 315 is connected to an internal voltage $V_{ref}$ and the other end is connected to the resistors in series R1 and R2 of the external adjusting unit 400. The resistor R1 is connected to the Hall voltage unit 200 and the resistor R2 is connected to the ground (GND). The resistors in series R1 and R2 are connected to generate voltage ($V_{MS}$). The voltage ($V_{MS}$) is compared with the internal voltage $V_{ref}$. When the $V_{MS}$ voltage is larger than the $V_{ref}$, the PWM direction control circuit 310 will output a MDC signal with low voltage level from the comparator 315. When the $V_{MS}$ voltage is smaller than the $V_{ref}$, the PWM direction control circuit 310 will output a MDC signal with high voltage level from the comparator 315. Moreover, another function in the voltage level of the partial voltage is to determine the initial amount of the PWM value. When the different between the voltage level and the internal voltage level $V_{ref}$ is smaller, the PWM value is smaller. When the different between the voltage level and the internal voltage level $V_{ref}$ is larger, the PWM value is larger. Please referring FIG. 3, the PWM vector transfer circuit 320 includes three voltage-to-current converters and a positive/negative triggered selector 3240. In the present embodiment, each of the voltage-to-current converters (3210, 3220, and 3230) is made by a different current mirror circuit (not shown). The positive/negative triggered selector 3240 includes a time delay filter to generate a small positive/negative triggered pulse and further includes several logic circuits configured to control four switches (S1~S4). The positive/negative triggered selector 3240 is configured to convert the input PWM control signals 20 to be several different modulated vector voltages in accordance with the different PWM pulse signals and the modulated vector voltages are converted to be $I_{F1}$ and $I_{F2}$ current by the third voltage-to-current converter (3230) and transmitted to the current control circuit 3310 of the PWM modulated signal generation circuit 330. The current values of $I_{F1}$ and $I_{F2}$ are the same.

The input end of the first voltage-to-current converter 3210 is connected to the internal voltage source and the converter 3210 is configured to convert voltage to be a first reference current ($I_{Vref}$). The input end of the second voltage-to-current converter 3220 is connected to the partial voltage level position of the resistors in series R1 and R2 and configured to convert the partial voltage level to be the second reference current ($I_{vms}$). Subsequently, the first reference current ($I_{Vref}$) generated by the first voltage-to-current converter 3210 and the second reference current ($I_{vms}$) generated by the second voltage-to-current converter 3220 are transmitted to a differential circuit 3250 and the differential circuit 3250 is configured to do a minus procedure between the first reference current ($I_{Vref}$) and the second reference current ($I_{vms}$) to generate a first current ($I_{diff}$). The first current ($I_{diff}$) is an initial value configured to determine the vector amount. The first current ($I_{diff}$) transmitted to the PWM signal generation circuit 3310 and the currents IA and IB are transmitted to the current control circuit 3310 and the current values of $I_A$ and $I_B$ are the same.

Now, the current control circuit 3310 calculates the PWM control signal 20, the control signal (MDC) of the PWM direction control circuit 310, the currents $I_{F1}$ and $I_{F2}$ converted by the modulated vector voltage signals and the current IA and IB generated by the initial vector, and the calculated currents are transmitted to the current-to-voltage converter 3320 (a capacitance C2 and an inverter). The vector value calculated by the current control circuit 3310 is converted to be modulation signal voltage modulated signal by the capacitance C2 of the current-to-voltage converter 3320 and the modulation signal voltage modulated signal is converted to be the digital signal by the inverter and transmitted to the motor output unit 100 to control the rotation of the motor. In addition, the inputted PWM control signal 20 and the control signal MDC of the PWM direction control circuit 310 are transmitted to the positive/negative triggered selector 3240 of the PWM vector transfer circuit 320. The PWM vector transfer circuit 320 is configured to provide a control signal to execute in accordance with the inputted PWM control signal 20 to determine the PWM signal is positive trigger or negative trigger.

As shown in FIG. 3, when the control signal MDC is in low voltage level, the switch S2 is closed and the S1 is opened. When the control signal MDC with low voltage level is processed by the positive/negative triggered selector 3240, the negative trigger is chosen and the switch S3 is closed and the switch S4 is opened. Because the input PWM control signal 20 is changed from the high voltage level to low voltage level, the switch S3 is closed at the negative trigger to pull the voltage of the capacitance C1 to be the reference voltage to be the initial value of the capacitance C1. In addition, the switch S2 is closed when the control signal is in low voltage level and the capacitance C1 will do a discharge at constant current in accordance with the current in switch S2. The discharge time period is determined by the time when the input PWM control signal 20 is in the low voltage level. When the duty cycle of the PWM control signal 20 is become larger and larger, obviously, the discharger time period of the capacitance C1 is decreased and the modulated vector voltage in the capacitance C1 is increased. The modulated vector voltage in the capacitance C1 is transmitted to the third voltage-to-current converter 3230 to generate a second current. The second current is increased when the voltage of the capacitance C1 is increased. Therefore, the PWM vector transfer circuit 320 will transmit the second current to the current control circuit 3310 of the PWM signal generation circuit 320 and the currents $I_{F1}$ and $I_{F2}$ are transmitted to the PWM signal generation circuit 330 to be the compensative shift value for the modulated signal. The current values of $I_{F1}$ and $I_{F2}$ are the same. Apparently, the compensation vector currents $I_{F1}$ and $I_{F2}$ outputted by the PWM vector transfer circuit 320 are become larger and larger.

Still referring to FIG. 3, when the control signal (MDC) is in high voltage level, the switch S1 is closed and the S2 is opened. When the control signal (MDC) with high voltage level is processed by the positive/negative triggered selector 3240, the positive trigger is chosen. At the mean time, the switch S3 is opened and the S4 is closed. When the switch S4 is in positive trigger, the switch S4 is closed when the inputted PWM control signal 20 is changed from the low voltage level to high voltage level so as to pull the voltage of the capacitance C1 to be 0 (at the ground point GND) as the initial value of the capacitance C1. Moreover, the switch S1 is in high voltage level in accordance with the control signal (MDC), and the switch S1 is closed. The capacitance C1 does a constant-current charge in accordance with the current in switch S1 when the PWM control signal is in high voltage level. When the duty cycle of the PWM control signal 20 is become larger, the charge time of the capacitance C1 is become longer and the voltage in the capacitance C1 is become larger and larger. A second current is generated by the third voltage-to-current converter 3230. The second current is become larger when the voltage of the capacitance C1 is become larger. The PWM vector transfer circuit 320 will transmit the second current to the current control circuit 3310 of the PWM signal generation circuit 330. The currents $I_{F1}$ and $I_{F2}$ are transmitted to the PWM signal generation circuit 330 to be the compensation shift value of the PWM signal and the currents $I_{F1}$ and $I_{F2}$ are the same. Apparently, the modulated vector value of the current $I_{F1}$ and $I_{F2}$ outputted by the PWM vector transfer circuit 320 is become larger.

Now still referring to FIG. 3, the PWM vector transfer circuit 330 includes a first current, a second current, a current control circuit 3310 and a current-to-voltage converter 3320. The first current in the PWM signal generation circuit 330 is divided into current $I_A$ and current $I_B$. The second current in the PWM signal generation circuit 330 is divided into current $I_{F2}$ and $I_{F1}$. In addition, the input end of the current control circuit 3310 is connected to the PWM control signal 20 and the output end of the current control circuit 3310 is connected to the capacitance C2 of the current-to-voltage converter 3320 and outputs a modulation signal voltage modulated signal through an inverter.

As the PWM signal generated shown in FIG. 3, the current $I_{F2}$ is plus the current $I_A$ and the current $I_{F1}$ is minus the current $I_B$. The control signal MDC outputted by the PWM direction control circuit 310 is transmitted to the PWM signal generation circuit 330, and the switch made by the transistor M1 and the transistor M2 is configured to do the $I_{F2}+I_A$ procedure or the $I_{F1}-I_B$. In the embodiment of the present invention, when the control signal MDC outputted by the PWM direction control circuit 310 is in low voltage level, the $I_{F1}-I_B$ procedure is chosen. When the control signal MDC outputted by the PWM direction control circuit 310 is in high voltage level, the $I_{F2}+I_A$ procedure is chosen. The detail description is in the following chapter.

Figure 4A:
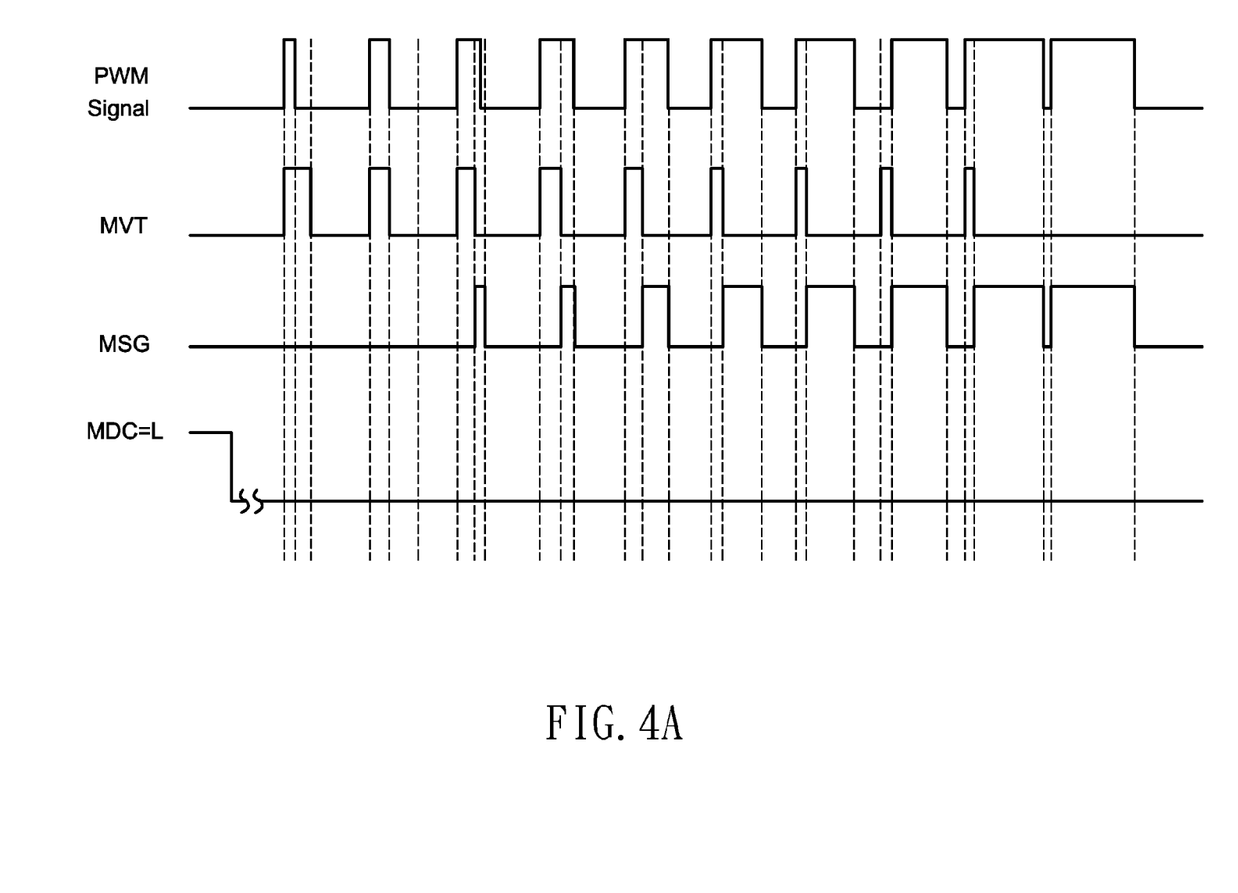
FIG. 4A is a view illustrating the modulation signal in the present invention when the control signal is in low voltage level.

As the description above, when the control signal MDC outputted by the PWM direction control circuit 310 is in low voltage level (as the MDC=L pulse in FIG. 4A), the current $I_{F1}$ is transmitted from the PWM vector transfer circuit 320 to the PWM signal generation circuit 330 and do the $I_{F1}-I_B$ procedure. and the current $I_{F1}$ is become larger as the duty cycle of the input PWM control signal 20 is larger, In addition, when the duty cycle of the input PWM control signal 20 is very small and the current $I_{F1}$ is very small, the current $I_{F1}$ minus the current $I_B$ is a negative value to represent that the voltage of the capacitance C2 won't be discharged and the result is transmitted to the current-to-voltage converter 3320 to be a modulated signal with low voltage level (as first half modulation signal wave in FIG. 4A). When the duty cycle of the inputted PWM control signal 20 is become larger, the current $I_{F1}$ is become larger. When the current $I_{F1}$ is larger than the current $I_B$, the current $I_{F1}$ minus the current $I_B$ is a positive value and the current of the capacitance C2 is released in accordance with the current $I_{F1}$. When the positive value is transmitted to the current-to-voltage converter 3320, there is a small pulse generated in the modulation signal voltage modulated signal and the pulse wave is become larger in accordance with $I_{F1}$ and the modulation signal voltage modulated signal is become larger. When the inputted PWM control signal 20 is 100% of PWM, the output is 100% transmitted, as shown the second half pulse wave of the modulation signal voltage modulated signal in FIG. 4A.

Figure 4B:
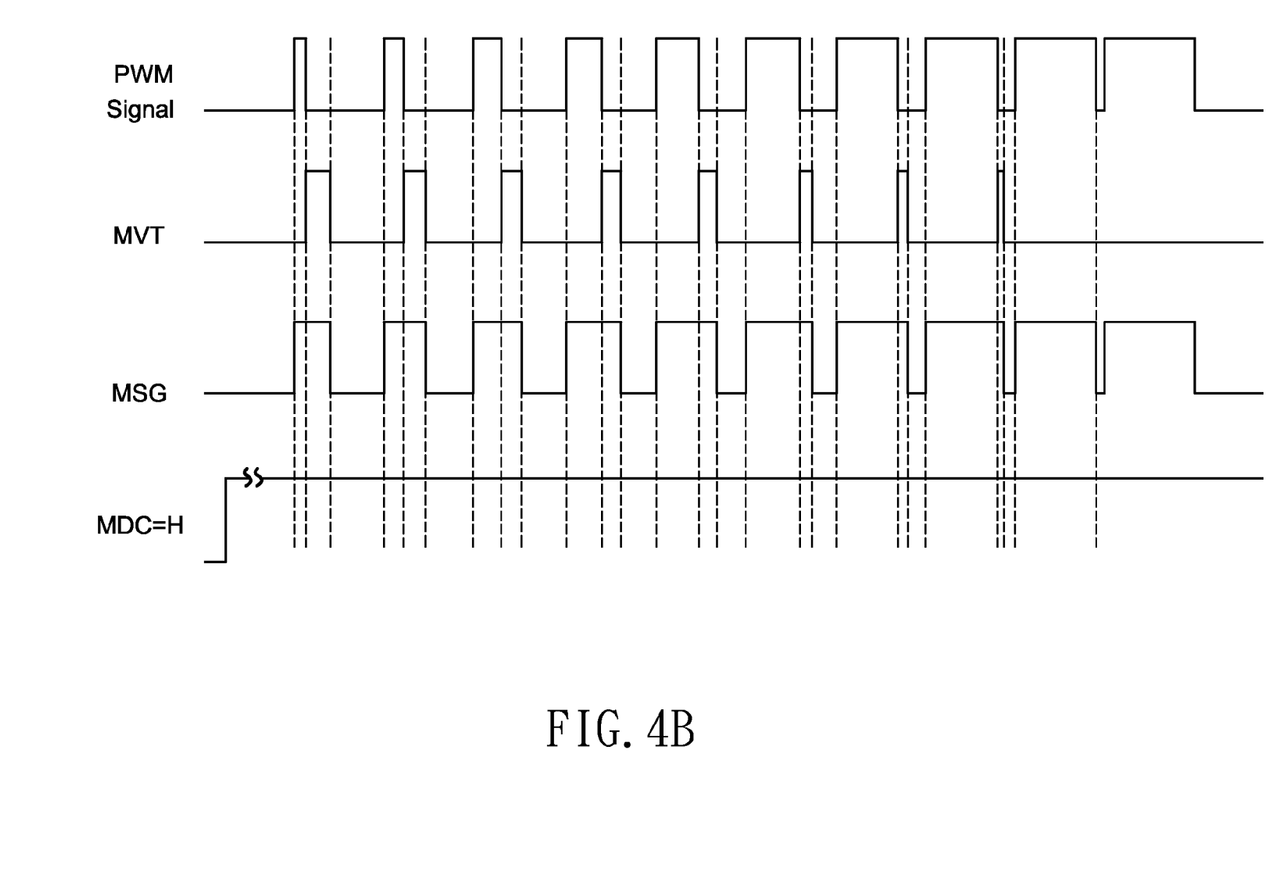
FIG. 4B is a view illustrating the modulation signal in the present invention when the control signal is in high voltage level.

When the control signal MDC of the PWM direction control circuit 310 is in high voltage level (as MDC=H wave, the current $I_{F2}$ is transmitted from the PWM vector transfer circuit 320 to the PWM signal generation circuit 330 and is added with the current $I_A$ and the current $I_{F2}$ is become larger when the duty cycle of the inputted PWM control signal 20 is become larger (as the PWM signal waveform shown in FIG. 4B). Similarly, when the duty cycle of the inputted PWM control signal 20 is very small and the current $I_{F2}$ is also very small, the current $I_{F2}$ plus the current $I_A$ is equal to a positive value to represent that the voltage of the capacitance C2 will be charged. However, because the current $I_{F2}$ is small, the charging current is still the current $I_A$ and the current $I_{F2}$ is transmitted to the current-to-voltage converter 3320 to be a modulated signal (as the first half modulation signal waveform shown in FIG. 4B).

Figure 5:
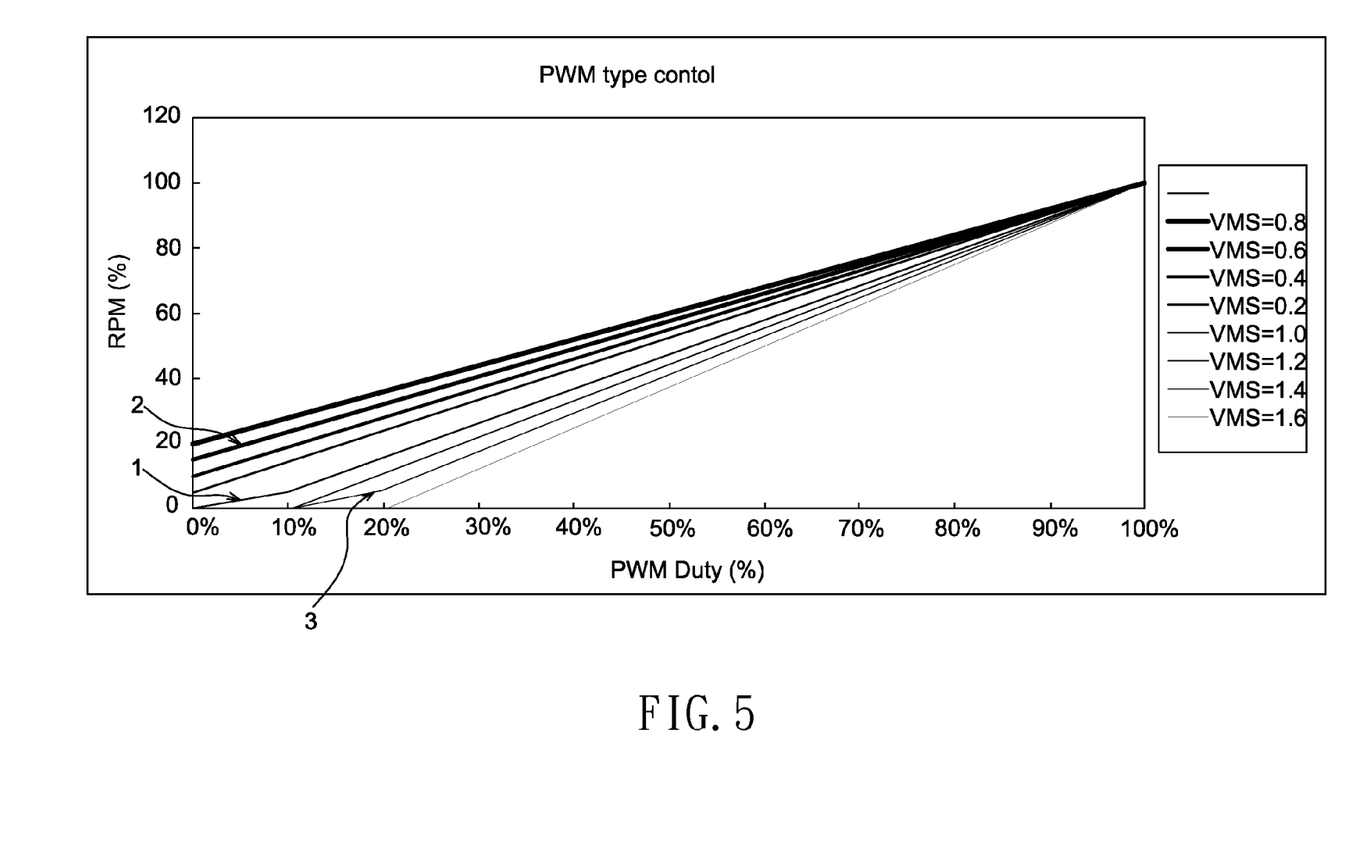
FIG. 5 is a curve view illustrating the rotation number and driving cycle in the present invention.

The modulation signal voltage modulated signal is the inputted PWM control signal 20 plus the modulated vector transfer voltage. When the duty cycle of the inputted PWM control signal 20 is become larger, the current $I_{F2}$ is become larger. When the current $I_{F2}$ is much larger than the current $I_A$, the current $I_{F2}$ plus the current $I_A$ is most likely equal to the current $I_{F2}$ and the bias value of the current $I_A$ is become smaller and smaller. The voltage of the capacitance C2 is charged by the current $I_{F2}$ plus the current $I_A$ and converted to be a modulation signal voltage modulated signal by the current-to-voltage converter 3320, as shown in second half modulation signal waveform in FIG. 4B. When the modulation signal voltage modulated signal is inputted to the output unit 100, the duty cycle of the modulation signal is configured to drive the output circuit 110 and the output circuit 130 to provide current on the coils of the motors to drive the motor 30 to rotate. The driving duty curve diagram of the RMS and modulation signal of the motor 30 is shown in FIG. 5 and each controlling curve in FIG. 5 is varied in accordance with the value of the external partial voltage level. For example, when the partial voltage is 1.0V, the driving cycle curve of the RMS and the modulation signal of the motor is shown as the first curve in FIG. 5. When the partial voltage is 0.4V, the driving cycle curve of the RMS and the modulation signal of the motor is shown as the second curve in FIG. 5. When the partial voltage is 1.4V, the driving cycle curve of the RMS and the modulation signal of the motor is shown as the third curve in FIG. 5. Apparently, in the present embodiment, when the partial voltage is small, the slope of the driving cycle curve of the RMS and the modulation signal of the motor is small and the motor rotation speed is decreased. When the partial voltage is increased, the slope of the driving cycle curve of the RMS and the modulation signal of the motor is become larger and the motor rotation speed is increased. Therefore, the present invention is able to adjust the motor rotation slope in accordance with the value of the partial voltage controlled by the external adjusting apparatus 400 according to the different thermal request of the system (such as desktop or laptop) so as to increase the flexibility of the application of the motor rotation control. It should be noted that the embodiment disclosed in the present invention is not designed to limit the slope of the driving cycle curve is become smaller when the partial voltage is smaller. In other words, the slope of the driving cycle curve could be smaller when the partial voltage is higher. Therefore, according to the disclosure in the present invention, the slope of the driving cycle curve is become smaller when the partial voltage is designed to be higher, and it is not limited herein.

Figure 6:
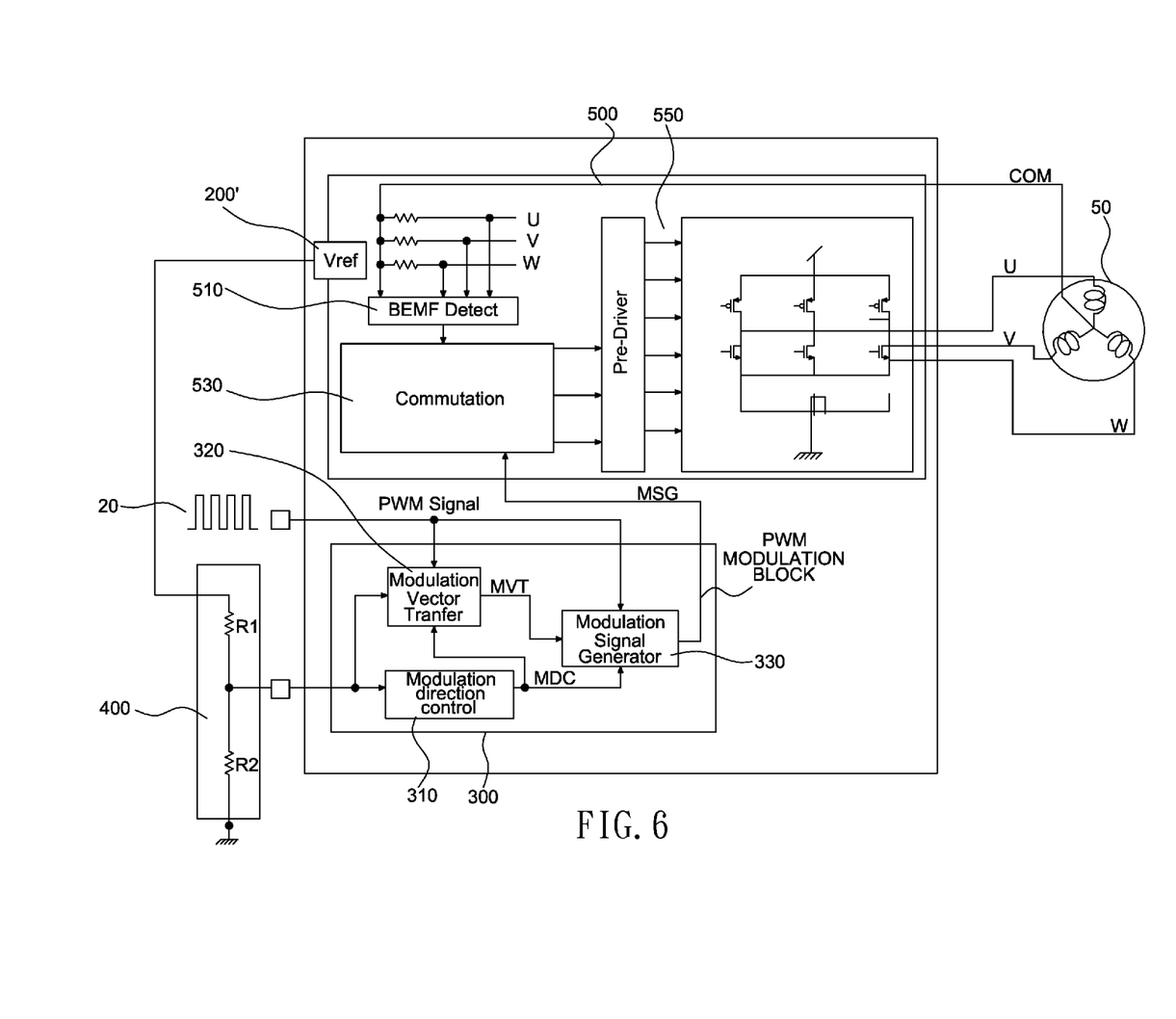
FIG. 6, it is a view illustrating the driving apparatus of the three-phase motor in the present invention.

Now, please referring to FIG. 6, it is a view illustrating the driving apparatus of the three-phase motor in the present invention. As shown in FIG. 6, the three-phase motor driving unit 500 in the present invention includes a back differential detector 510, a phase rotation circuit 530, a motor driving circuit 550 and a voltage source provider 200'. The back differential detector 510 is connected to the three-phase motor 50 and configured to detect three-phase (U, V and W) of the three-phase motor 50. The three-phase of the three-phase motor 50 are transmitted to the phase rotation circuit 530 to covert to the corresponding driving voltages. The driving voltages are outputted to the motor driving circuit 550 to drive the external motor 50. In addition, in this embodiment of the present invention, the three-phase motor 50 is a three-phase motor 50 without any sensors. Because the structure of the three-phase motor in the present invention is the same as the conventional three-phase motor, the detail description of the three-phase motor is omitted herein.

The main technique of the present invention is to provide a PWM modulation block 300 and the PWM modulation block 300 is configured to adjust the inputted PWM control signal 20 in accordance with the value of the partial voltage. One end of the external adjusting unit 400 is connected to the voltage source provider 200' and is configured to generate the partial voltage. The PWM modulation block 300 can output different modulation signal in accordance with the value of the partial voltage. The modulation signal outputted from the PWM modulation block 300 is transmitted to the phase rotation circuit of the three-phase driving unit 530 of the three-phase motor driving unit 500 to adjust the motor rotation slope in accordance with the modulation signal.

Although specific embodiments have been illustrated and described, it will be appreciated by those skilled in the art that various modifications may be made without departing from the scope of the present invention, which is intended to be limited solely by the appended claims.

What is claimed is:

1. A motor driving apparatus with a pulse width modulation (PWM) module including a motor, a motor output unit connected to the motor and a PWM modulation block, and the PWM modulation block comprises:
    a PWM direction control circuit configured to output a voltage signal;
    a PWM vector transfer circuit and an input end of the PWM vector transfer circuit is connected to the PWM direction control circuit and configured to convert a PWM control signal to be a vector voltage and the PWM control signal is transmitted to an output end; and
    a PWM signal generation circuit, an input end of the PWM generation circuit is connected to the PWM direction circuit and outputs a signal generation voltage modulation signal;
    wherein the signal generation voltage modulation signal is an output current transmitted from a current control circuit and the current is transmitted to a current-to-voltage converter to generate the signal generation voltage modulation signal and the signal generation voltage modulation signal is transmitted to the motor output unit.

2. The motor driving apparatus according to claim 1, wherein the voltage signal outputted by the PWM direction control circuit is compared with the first voltage and the reference voltage by a comparator.

3. The motor driving apparatus according to claim 1, wherein the PWM direction control circuit is connected to an external adjusting apparatus, and the external adjusting apparatus is a partial voltage circuit made by a plurality of resistors, and one end of the external adjusting apparatus is connected to a voltage apparatus to generate the first voltage.

4. The motor driving apparatus according to claim 1, wherein the PWM vector transfer circuit includes three voltage-to-current converters, a differential circuit and a time delay filter.

5. The motor driving apparatus according to claim 4, wherein an input end of the first voltage-to-current converter is connected to the reference voltage and the reference voltage is converted to be a first reference current ($I_{Vref}$) and an input end of the second voltage-to-current converter is connected to the first voltage so as to convert to be a second reference current ($I_{vms}$), and the first reference current ($I_{Vref}$) and the second reference current ($I_{vms}$) are transmitted to the differential circuit to generate the first current.

6. The motor driving apparatus according to claim 4, wherein an input end of the third voltage-to-current converter is connected to the modulate vector voltage and the modulate vector voltage is converted to be a second current and output the second current.

7. The motor driving apparatus according to claim 6, wherein the third voltage-to-current converter is made by a current mirror circuit.

8. The motor driving apparatus according to claim 1, wherein the current control circuit includes a switch made by a transistor M1 and a transistor M2 to do a negative trigger in accordance with the voltage signal outputted from the PWM direction control circuit.

9. The motor driving apparatus according to claim 1, wherein the current control circuit includes a switch made by a transistor M1 and a transistor M2 to do a positive trigger in accordance with the voltage signal outputted from the PWM direction control circuit.

10. A motor driving apparatus with a PWM modulation block comprising includes a three-phase motor, a three-phase motor output unit connected to the three-phase motor and a PWM modulation block, and the PWM modulation block comprises:
   a PWM direction control circuit, an input end of the PWM direction control circuit is connected to an external adjusting apparatus and the external adjusting apparatus is configured to provide a first voltage, and another input of the PWM direction control circuit is connected to a reference voltage and output a voltage signal after the first voltage is compared with the reference voltage;
   a PWM vector transfer circuit and an input end of the PWM vector transfer circuit is connected to the PWM direction control circuit and configured to convert a PWM control signal to be a vector voltage and the PWM control signal is transmitted to an output end; and
   a PWM signal generation circuit, an first input end of the PWM generation circuit is connected to the first current and the second current, a second input end is connected to the voltage signal of the PWM direction control circuit, a third end is connected to a PWM control signal and outputs a modulation signal voltage modulated signal;
   wherein the signal generation voltage modulation signal is a current calculated by a current control circuit, and the current is transmitted to a current-to-voltage converter to output a signal generation voltage modulation signal and the signal generation voltage modulation signal is outputted to the three-phase motor driving unit.

11. The motor driving apparatus of claim 10, wherein the three-phase motor driving unit includes a negative differential detector, a phase rotation circuit and a motor driving circuit, and the negative different detector is connected to the three-phase motor and configured to detect three-phase (U, V and W) of the three-phase motor and transmit the three-phase to the phase rotation circuit to convert to be a corresponding driving voltage, and the driving voltage is transmitted to the motor driving circuit to drive the external motor.

12. The motor driving apparatus according to claim 10, wherein the voltage signal outputted by the PWM direction control circuit is compared with the first voltage and the reference voltage by a comparator.

13. The motor driving apparatus according to claim 10, wherein the PWM direction control circuit is connected to an external adjusting apparatus, and the external adjusting apparatus is a partial voltage circuit made by a plurality of resistors, and one end of the external adjusting apparatus is connected to a voltage apparatus to generate the first voltage.

14. The motor driving apparatus according to claim 10, wherein the PWM vector transfer circuit includes three voltage-to-current converters, a differential circuit and a time delay filter.

15. The motor driving apparatus according to claim 14, wherein an input end of the first voltage-to-current converter is connected to the reference voltage and the reference voltage is converted to be a first reference current ($I_{Vref}$) and an input end of the second voltage-to-current converter is connected to the first voltage so as to convert to be a second reference current ($I_{vms}$), and the first reference current ($I_{Vref}$) and the second reference current ($I_{vms}$) are transmitted to the differential circuit to generate the first current.

16. The motor driving apparatus according to claim 14, wherein an input end of the third voltage-to-current converter is connected to the modulate vector voltage and the modulate vector voltage is converted to be a second current and output the second current.

17. The motor driving apparatus according to claim 16, wherein the third voltage-to-current converter is made by a current mirror circuit.

18. The motor driving apparatus according to claim 10, wherein the current control circuit includes a switch made by a transistor M1 and a transistor M2 to do a negative trigger in accordance with the voltage signal outputted from the PWM direction control circuit.

19. The motor driving apparatus according to claim 10, wherein the current control circuit includes a switch made by a transistor M1 and a transistor M2 to do a positive trigger in accordance with the voltage signal outputted from the PWM direction control circuit.

* * * * *